United States Patent [19]
Lajoie

[11] Patent Number: 6,139,109
[45] Date of Patent: Oct. 31, 2000

[54] RACE CAR SEAT AND JIG AND METHOD FOR MAKING THE SAME

[75] Inventor: Randall J. Lajoie, Cabarrus County, N.C.

[73] Assignee: The Joie of Seating, Inc., Concord, N.C.

[21] Appl. No.: 09/246,820

[22] Filed: Feb. 8, 1999

[51] Int. Cl.$^7$ ..................................................... A47C 7/16
[52] U.S. Cl. ............................... 297/452.28; 297/422.24; 297/452.36; 297/452.25; 297/452.34; 29/281.5; 269/37; 269/45
[58] Field of Search .................. 297/452.28, 452.24, 297/452.25, 452.34, 452.36; 269/37, 45; 29/281.5

[56] References Cited

U.S. PATENT DOCUMENTS

| | | | |
|---|---|---|---|
| 2,970,638 | 2/1961 | Halter | 297/452.36 X |
| 4,485,539 | 12/1984 | Blaine | 29/281.5 X |

FOREIGN PATENT DOCUMENTS

| | | | |
|---|---|---|---|
| 320229 | 4/1920 | Germany | 297/452.24 |
| 950413 | 2/1964 | United Kingdom | 297/452.24 |

*Primary Examiner*—Peter M. Cuomo
*Assistant Examiner*—Rodney B. White
*Attorney, Agent, or Firm*—Ware, Fressola, Van Der Sluys & Adolphson LLP

[57] ABSTRACT

A race car seat is fabricated of four seat quadrants temporarily secured on seat fitments and welded together. The seat fitments are adjustably positioned on a jig in an optimum position for a race car driver. The jig includes adjustment plates for setting the width, tilt, and height of the seat fitments. The seat quadrants are then removably secured to the fitments and welded together to form a seat corresponding to the optimum configuration set by the position of the fitments on the jig.

20 Claims, 11 Drawing Sheets

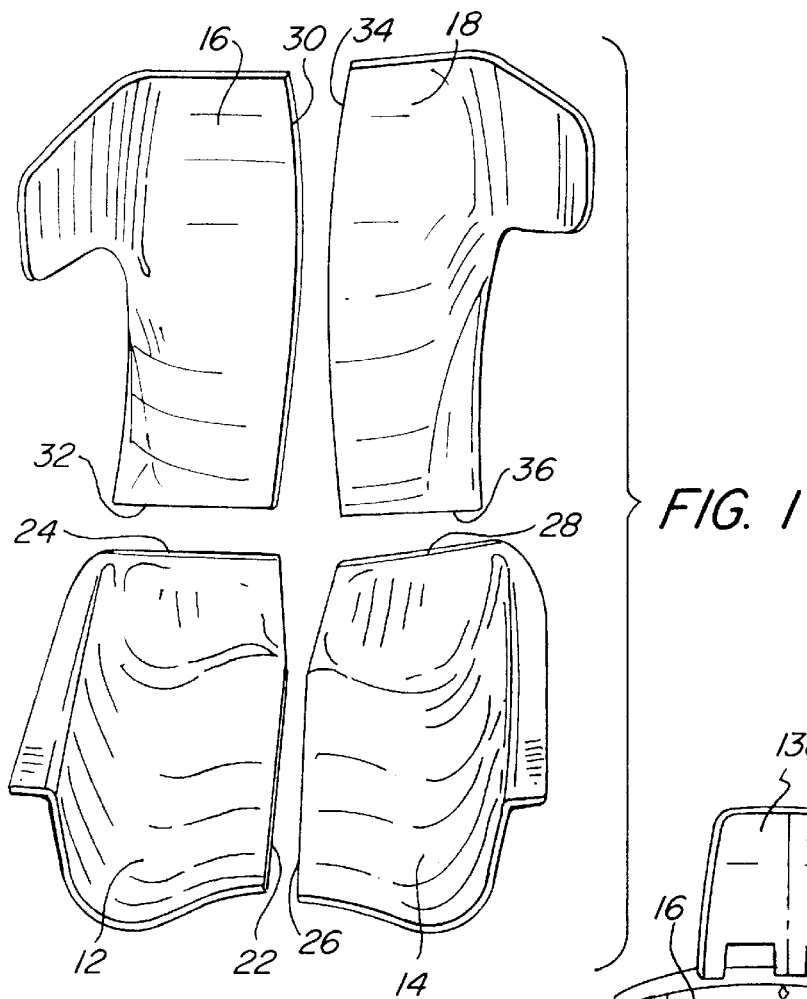
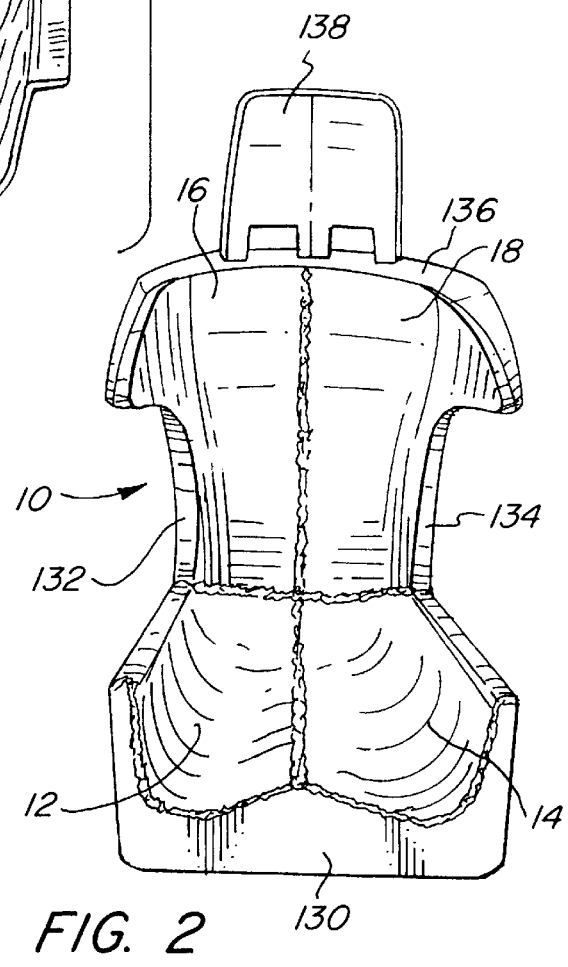
FIG. 1
FIG. 2

RACE CAR SEAT AND JIG AND METHOD FOR MAKING THE SAME

FIELD OF THE INVENTION

The invention herein relates to seats for race cars, and a jig and method for making race car seats.

BACKGROUND OF INVENTION

Race cars require seats that closely accommodate and support the driver. Such characteristics are important for both safety and performance of the driver.

From the standpoint of safety, a seat that closely accommodates and supports the driver will also better restrain the driver in a crash. The driver is less likely to be injured if the driver is maintained at a secure point in the car, and if the driver does not impact against the race car seat itself.

For performance purposes, a seat that closely accommodates and supports the driver provides a secure and stable platform from which the driver may steer the race car and manipulate the other controls thereof. It is also important that the shape and position of the seat parts, while closely accommodating and securing the driver, establish a position from which the driver is most efficient and comfortable in steering the car and operating the pedals and other controls. This not only increases the accuracy of driver inputs, but also reduces driver fatigue.

For the foregoing reasons, there is a need for a race car seat which closely accommodates and secures the driver in an optimum driving position.

SUMMARY OF INVENTION

It is a principal object of the invention herein to provide a race car seat which closely accommodates and supports a driver in an optimum driving position.

It is a further object of the invention herein to provide a race car seat of the foregoing character which is rigid and strong.

It is another object of the invention herein to provide for making a race car seat that closely accommodates and supports a driver.

It is an additional object of the invention herein to provide a method for making a race car seat in which the seat the configuration of the seat is selected by the race car driver.

It is a further object of the invention herein to provide apparatus for making a race car seat in the configuration selected by the race car driver.

In carrying out the foregoing objects of the invention, a race car seat includes a right seat bottom quadrant formed from sheet metal, substantially fitted to the right buttock and thigh of the driver and having a longitudinal central edge and a lateral upper edge, and a left seat bottom quadrant also formed from sheet metal and substantially fitted to the left buttock and left thigh of the driver, and having a longitudinal central edge welded to the longitudinal central edge of the right seat bottom quadrant and further having a lateral upper edge. The race car seat also includes a right seat back quadrant formed from sheet metal and substantially fitted to the right back and shoulder of the driver, and having a lateral lower edge welded to the upper lateral edge of the right seat bottom quadrant, and also having a longitudinal central edge. The race car seat further includes a left upper seat back quadrant formed from sheet metal and substantially fitted to the left back and shoulder of the driver, and having a lateral lower edge welded to the lateral upper edge of the left seat bottom quadrant, and having a longitudinal central edge welded to the longitudinal central edge of the right seat back quadrant.

The race car seat quadrants are preferably welded together after being placed in positions which closely accommodate and support the driver. According to further aspects of the invention, strengthening and stiffening seat parts are welded to the periphery of the race car seat, and a head support is welded to one or both of the seat back quadrants of the race car seat.

In also carrying out the foregoing objects of the invention, the race car seat is fabricated by forming at least two each of the seat quadrants in oversize dimensions. One each of the seat quadrants is reduced in size to provide fitments, the fitments being sized to closely accommodate a portion of the driver's body without touching adjacent fitments when the fitments are adjusted to the driver. The fitments are adjustably positioned with respect to the race car driver in substantially a selected driving position and the fitments are secured in that position. The oversize seat quadrants are matingly positioned on the position adjusted fitments, and are trimmed to provide substantially coextensive edges with adjacent seat quadrants. The seat quadrants are then joined together to form the race car seat consistent with the adjustably positioned fitments, which established the desired configuration of the race car seat.

According to further aspects of the invention, the seat quadrants are secured together by welding. The seat quadrants are tack welded together while supported on the fitments, and completion of the welding is carried out after removing the joined seat quadrants from the fitments.

In further carrying out the objects of the invention, a jig is provided for use in fabricating the race car seat. The jig includes a base and a back wall upstanding therefrom. A right seat bottom fitment is supported on a right seat bottom adjustment plate, and the adjustment plate is movably mounted to the base and securable in an adjusted position on the base. A left seat bottom fitment is supported on a left seat bottom adjustment plate movably mounted to the base and securable thereon in an adjusted position. A right seat back fitment is supported on at least one right seat back adjustment plate movably mounted to the back wall and securable with respect thereto. A left seat back fitment is supported on at least one left seat back adjustment plate movably mounted to the back wall and securable thereto in adjusted position. A driver sits in the fitments and the fitments are adjusted to positions selected by the driver sitting therein and secured in the desired positions. Thereafter, the fitments may be used to fabricate a racing seat in conformance with the adjusted fitments.

According to further aspects of the invention, the at least one adjustment plate for each of the seat back fitments includes a pivotally mounted tilt adjustment plate for establishing a seat back angle with respect to the seat bottom fitments. The tilt adjustment plate is adjustably secured to a width adjustment plate. According to an additional aspect of the invention herein, the at least one adjustment plate includes a height adjustment panel slidably secured to the back wall of the jig, and mounting the tilt and width additional adjustment plates for the seat back fitments.

Other and more specific objects and features of the invention will be understood by those skilled in the art and will also appear in the following description of the preferred embodiments, taken together with the drawings.

BRIEF DESCRIPTION OF DRAWINGS

FIG. 1 is a perspective view of seat quadrants for fabricating a race car seat according to the invention herein;

FIG. 2 is a perspective view of a race car seat according to the invention herein, fabricated from the seat quadrants of FIG. 1;

The same reference numerals refer to the same elements through out the various figures.

DESCRIPTION OF PREFERRED EMBODIMENTS

Figure 3:
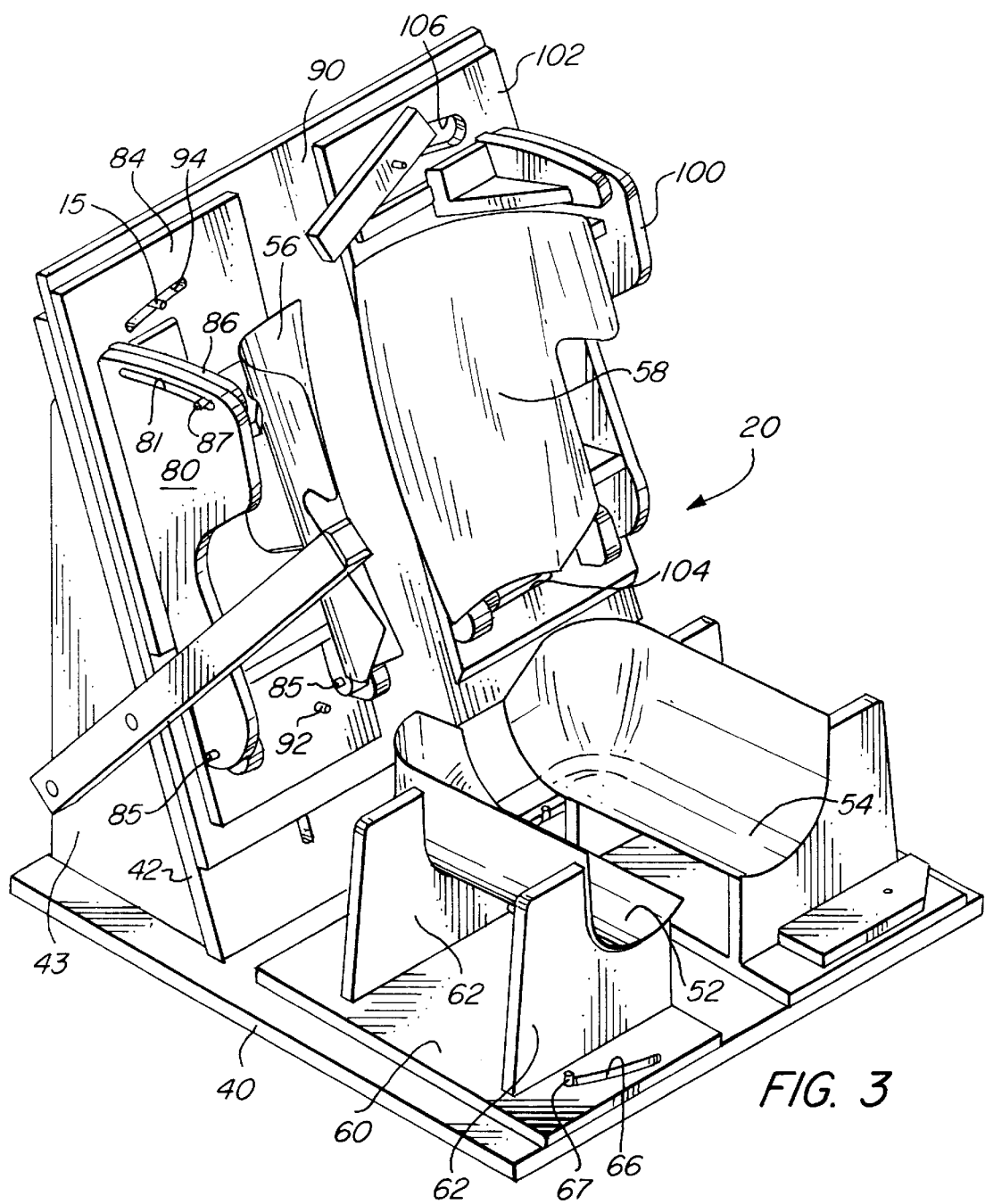
FIG. 3 is a perspective view of a jig for fabricating a racing car seat, according to the invention herein.
Figure 4:
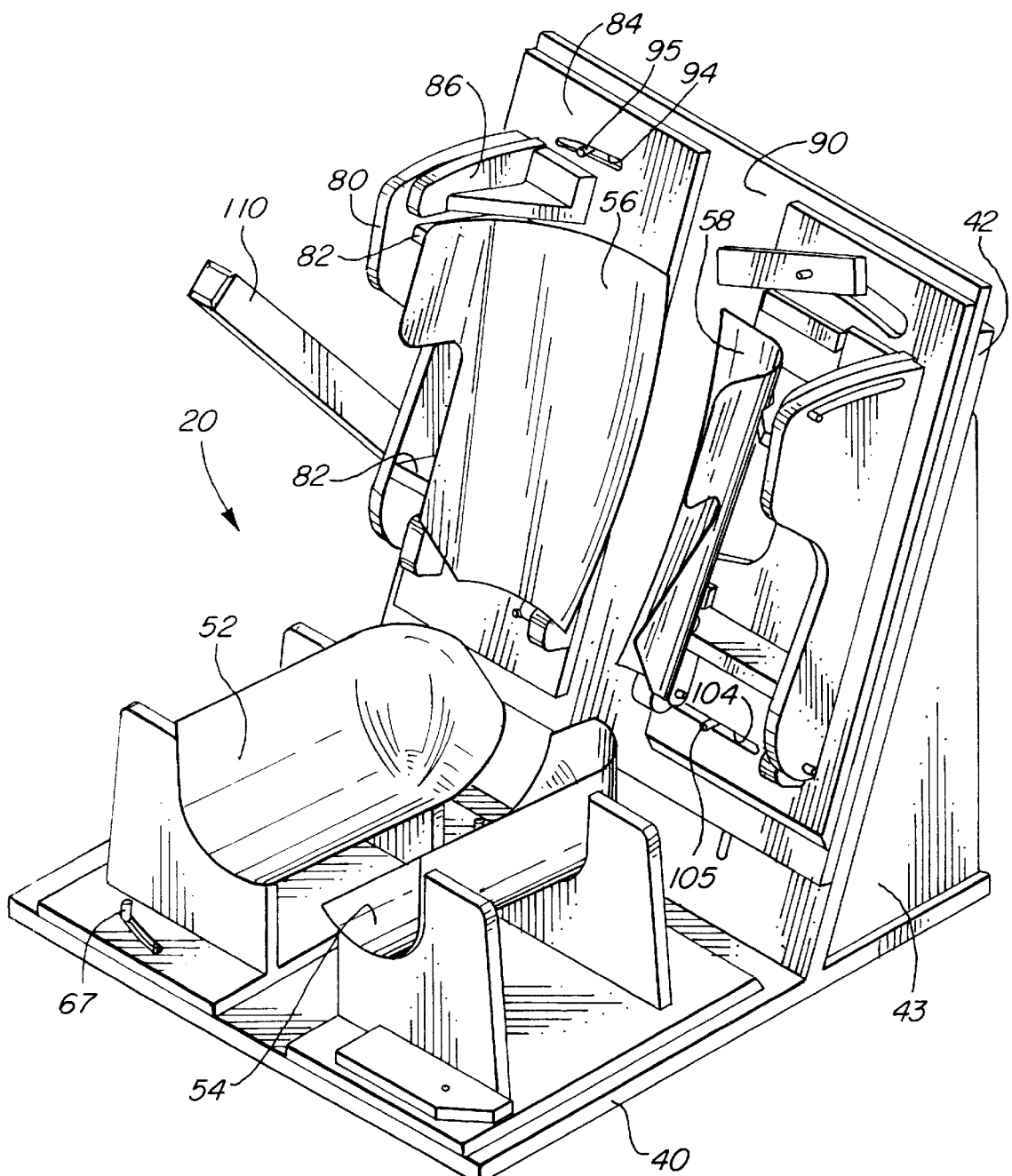
FIG. 4 is another perspective view of the jig of FIG. 3.

A race car seat 10 is shown in FIG. 2. It is fabricated from the seat quadrants 12, 14, 16 and 18 shown in FIG. 1, using the jig 20 shown in FIGS. 3–11. In more fully describing the seat 10, the seat quadrants and the jig, the directions "right," "left," "bottom," and "upper" refer to directions with respect to a race car driver sitting in the seat 10.

The race car seat 10 is fabricated from four seat quadrants shown in FIG. 1. These are a right seat bottom quadrant 12, which is shaped to substantially conform to the right buttock and thigh of a driver. The right seat bottom 12 has a longitudinal central edge 22 and a lateral upper edge 24. Also provided is a left seat bottom quadrant 14. The left seat bottom 14 substantially conforms to the left buttock and thigh of the driver, and has a longitudinal central edge 26 and a lateral upper edge 28. The right seat back quadrant 16 is shaped to substantially conform to the right back and right shoulder of the driver, and has a longitudinal central edge 30 and a lower lateral edge 32. The left seat back quadrant 18 is shaped to fit the left back and left shoulder of the driver, and has a central longitudinal edge 34 and a lateral edge 36. Each of the seat quadrants 12, 14, 16 and 18 are formed from stamped sheet metal, which is preferably aluminum sheet having a thickness of 0.090". As will become more clear from the following description, each of the seat quadrants is initially formed in "oversize" dimensions, that is, if the seat quadrants as initially formed were placed together, they would form a seat too large for the largest driver. In fabricating the seat 10 using the jig 20, the seat quadrants are reduced in size to closely accommodate and support a particular race driver. It has been found, however, that a predetermined stamped shape for each seat quadrant is adaptable to race drivers who are not either excessively large or small.

With reference to FIGS. 3–11, the jig 20 has a base 40 and back wall 42 angularly upstanding therefrom and supported by braces 43. The jig 20 is characterized by having seat fitments 52, 54, 56 and 58 adjustably supported on the base 40 and back wall 42. Each of the fitments is fabricated from a corresponding stamped seat quadrant 12, 14, 16, and 18, the fitments being trimmed about their peripheries to have smaller sizes while still providing substantial conformance with the driver's body.

Figure 5:
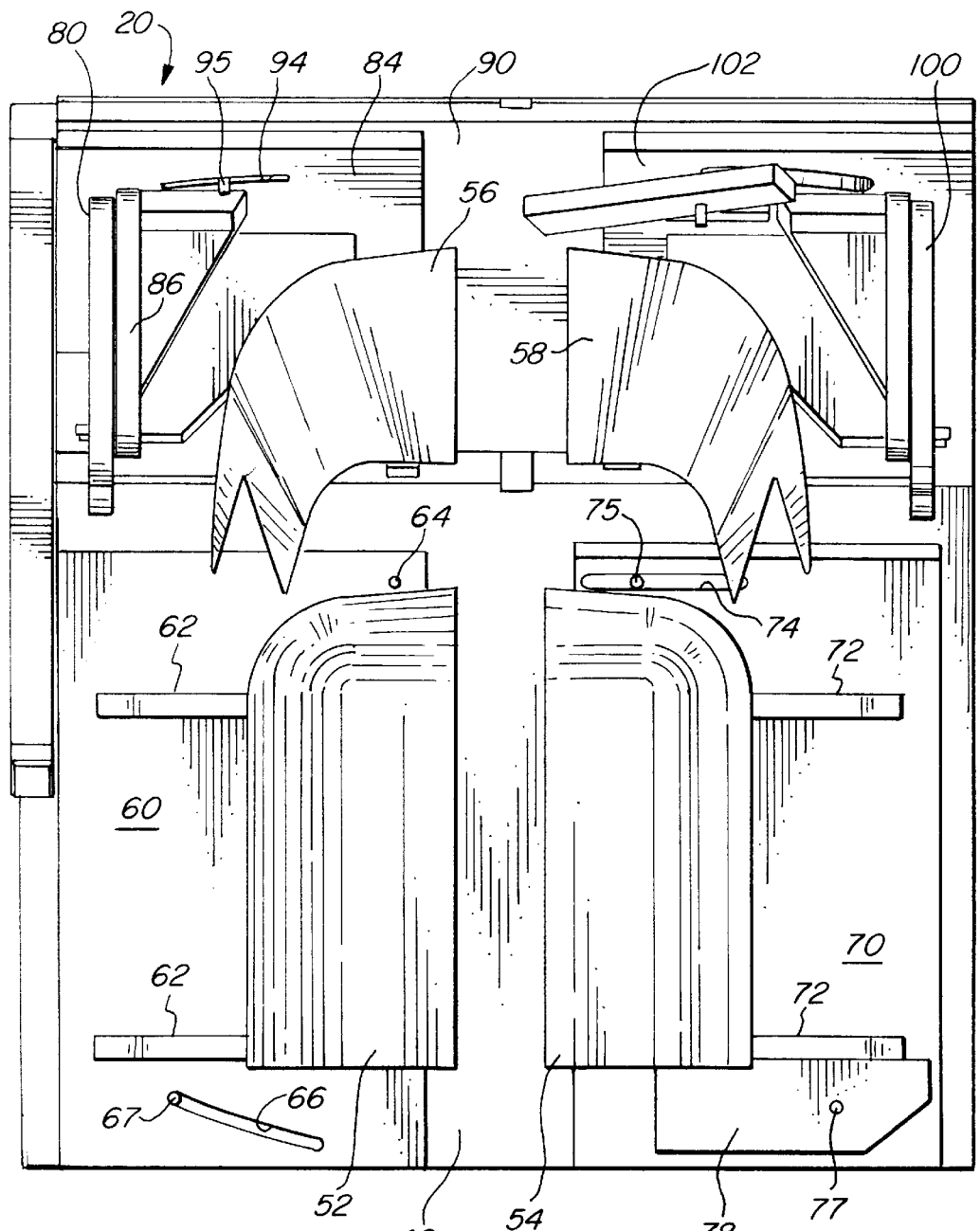
FIG. 5 is a top view of the jig of FIG. 3.
Figure 6:
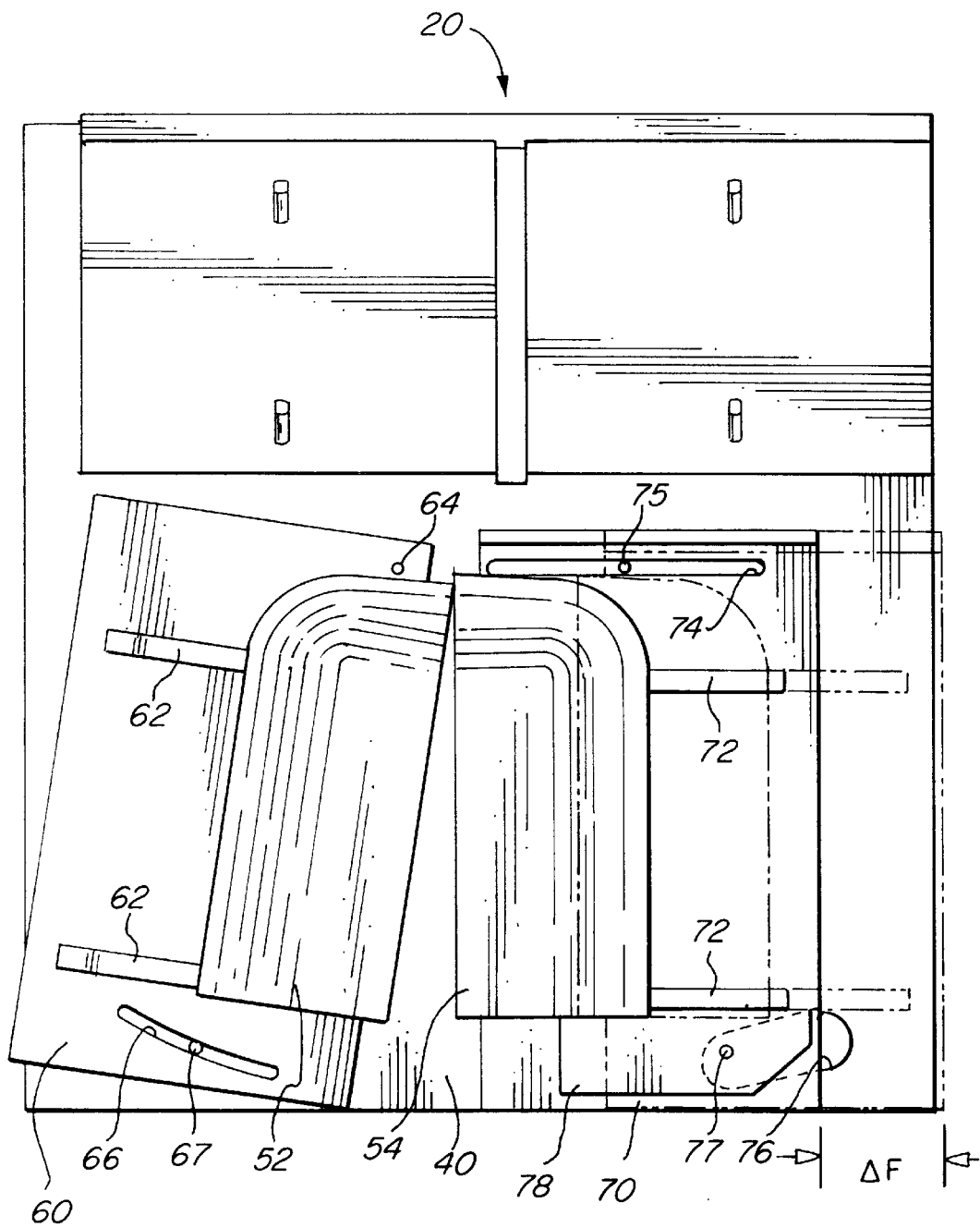
FIG. 6 is a top view of the jig of FIG. 3, with the seat back fitments and mounting plates thereof removed.
Figure 7:
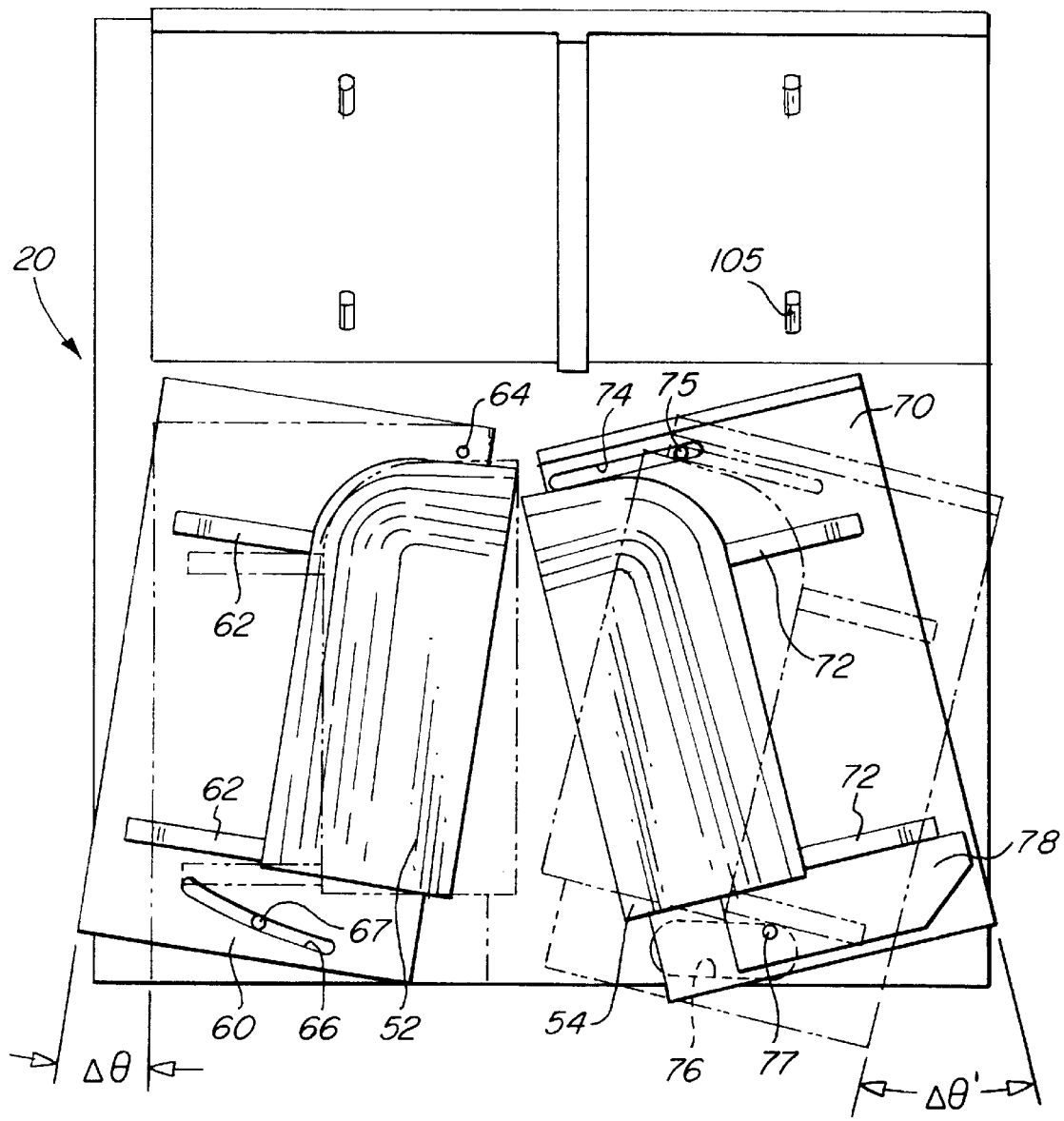
FIG. 7 is a top view of the jig FIG. 3, similar to FIG. 6 and illustrating a range of adjustable positions of the seat bottom fitments.

The right seat bottom fitment 52 is mounted to an adjustment plate 60 by brackets 62. The adjustment plate 60 is movably positioned on the base 40 and, with reference to FIGS. 5–7, is pivotally connected to the base 40 on a pivot pin 64. Pivot pin 64 provides a fixed reference point for adjusting all four seat fitments 52, 54, 56 and 58. Adjustment plate 60 is provided with a slot 66 accommodating a threaded post 67 upstanding from the base 40. With continued reference to FIGS. 5–7, the adjustment plate 60 and the right seat bottom fitment 52 supported thereon may be adjusted through a range of orientations, such as the angle $\Delta\Theta$ shown in FIG. 7. A clamp, not shown but in the nature of a wing nut or the like, may be secured to the threaded post 67 to clamp the adjustment plate 60 in a desired position. Whenever a threaded post is discussed extending through an adjustment plate, it will be understood that a wing nut or the like may be used to secure the adjustment plate at a selected position.

The left seat bottom fitment 54 is supported on adjustment plate 70 by brackets 72. The adjustment plate 70 is movably positioned on the base 40 by means of a first slot 74 having a threaded post 75 extending upwardly therethrough, and by an enlarged slot 76, best seen in FIGS. 6 and 7. The slot 76 has a threaded post 77 extending upwardly therethrough and is provided with a clamping block 78.

With reference to FIG. 6, adjustment plate 70 may be moved laterally on the base 40 to provide side-to-side adjustment of the fitment 54 with respect to the fitment 52, e.g., by the distance $\Delta F$. With respect to FIG. 7, by virtue of the enlarged slot 76, the adjustment plate 70 may be moved through a wide range of angular adjustments $\Delta\Theta'$ and, in combination with the side-to-side adjustment shown in FIG. 6 and the adjustability of the seat fitment 52, virtually all spacings and orientations necessary to fit a driver can be achieved.

Figure 8:
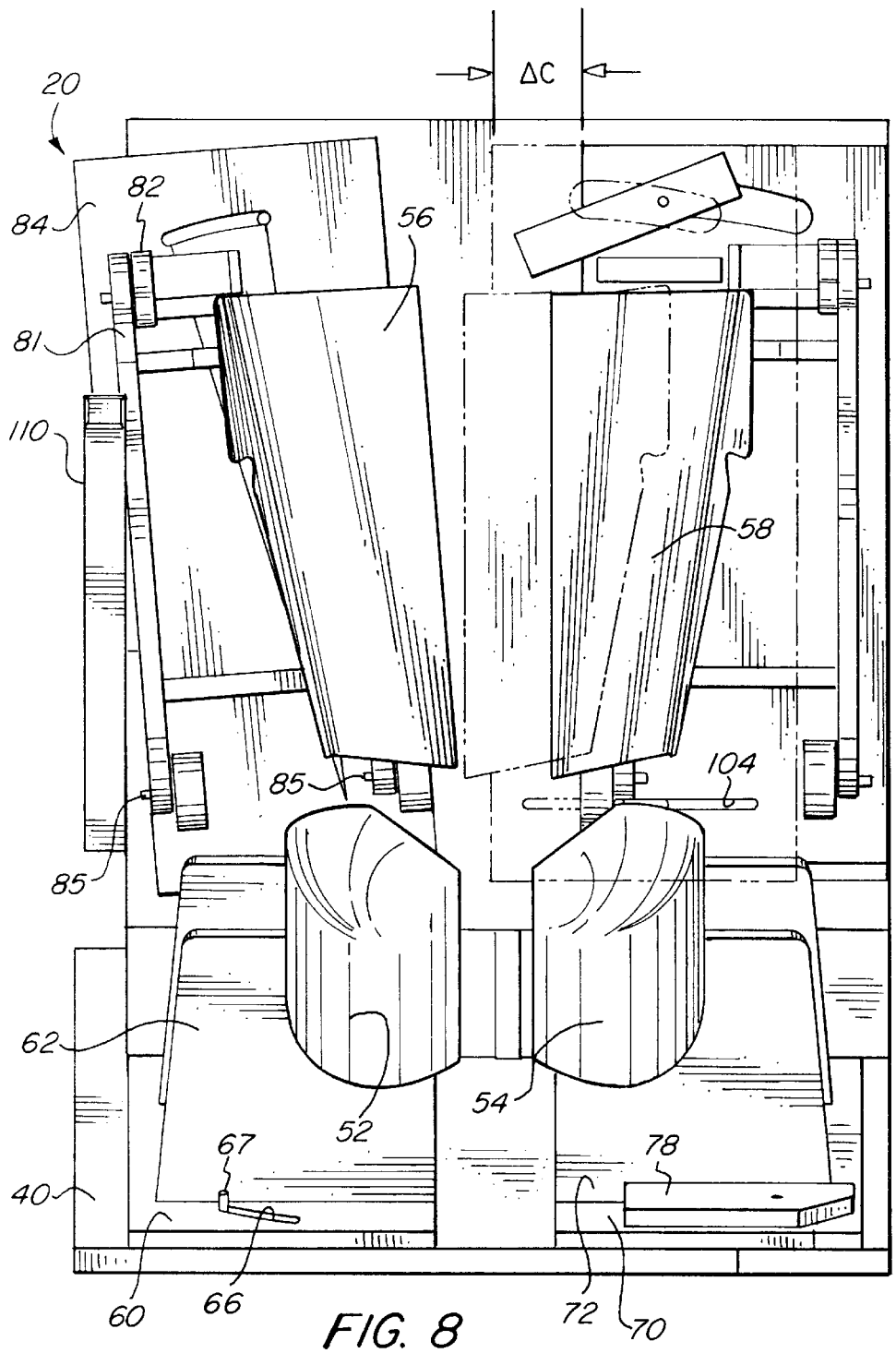
FIG. 8 is a front perspective view of the jig of FIG. 3.
Figure 9:
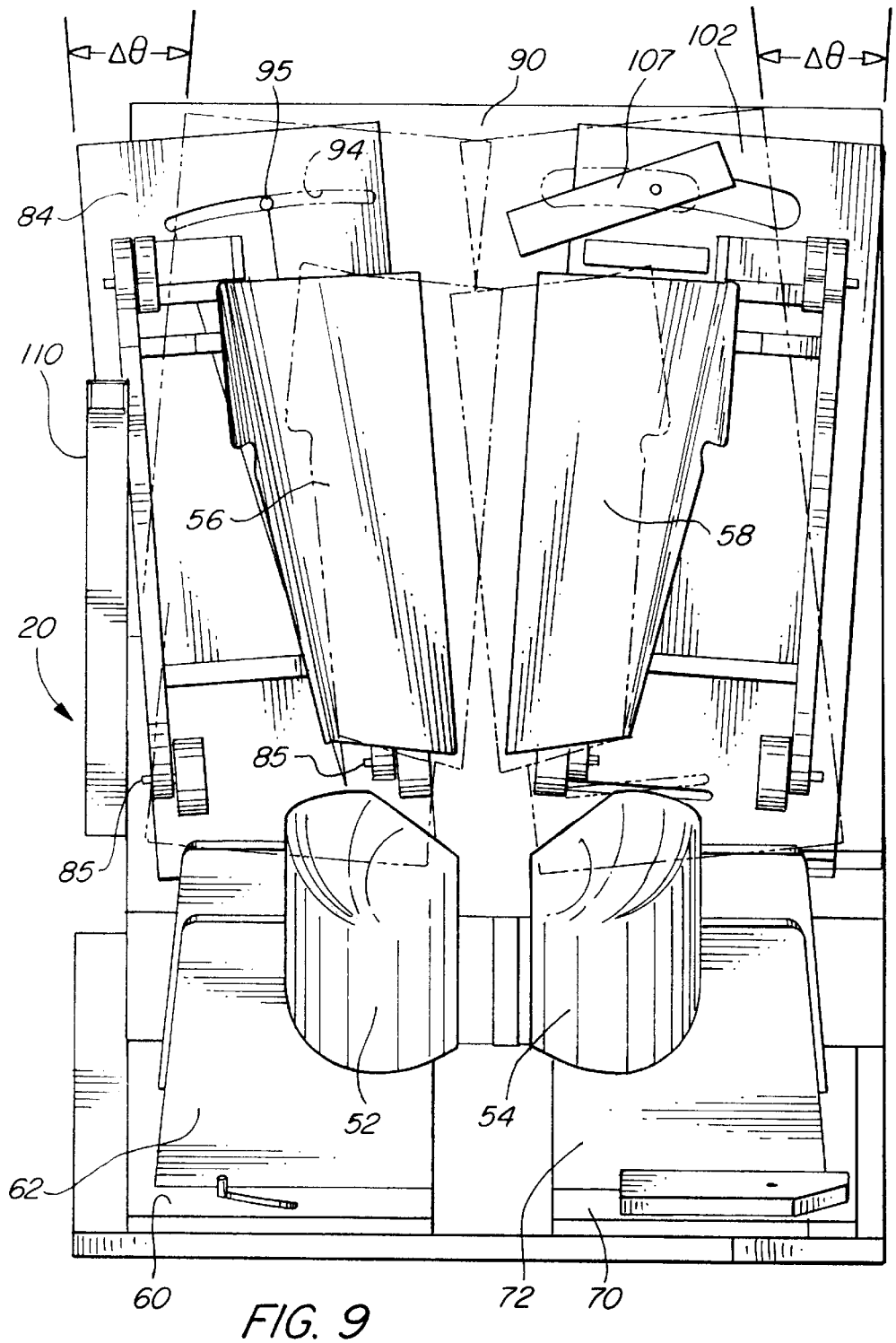
FIG. 9 is a front perspective view of the jig of FIG. 3, similar to FIG. 8 but with the seat back fitments in different adjusted positions.
Figure 10:
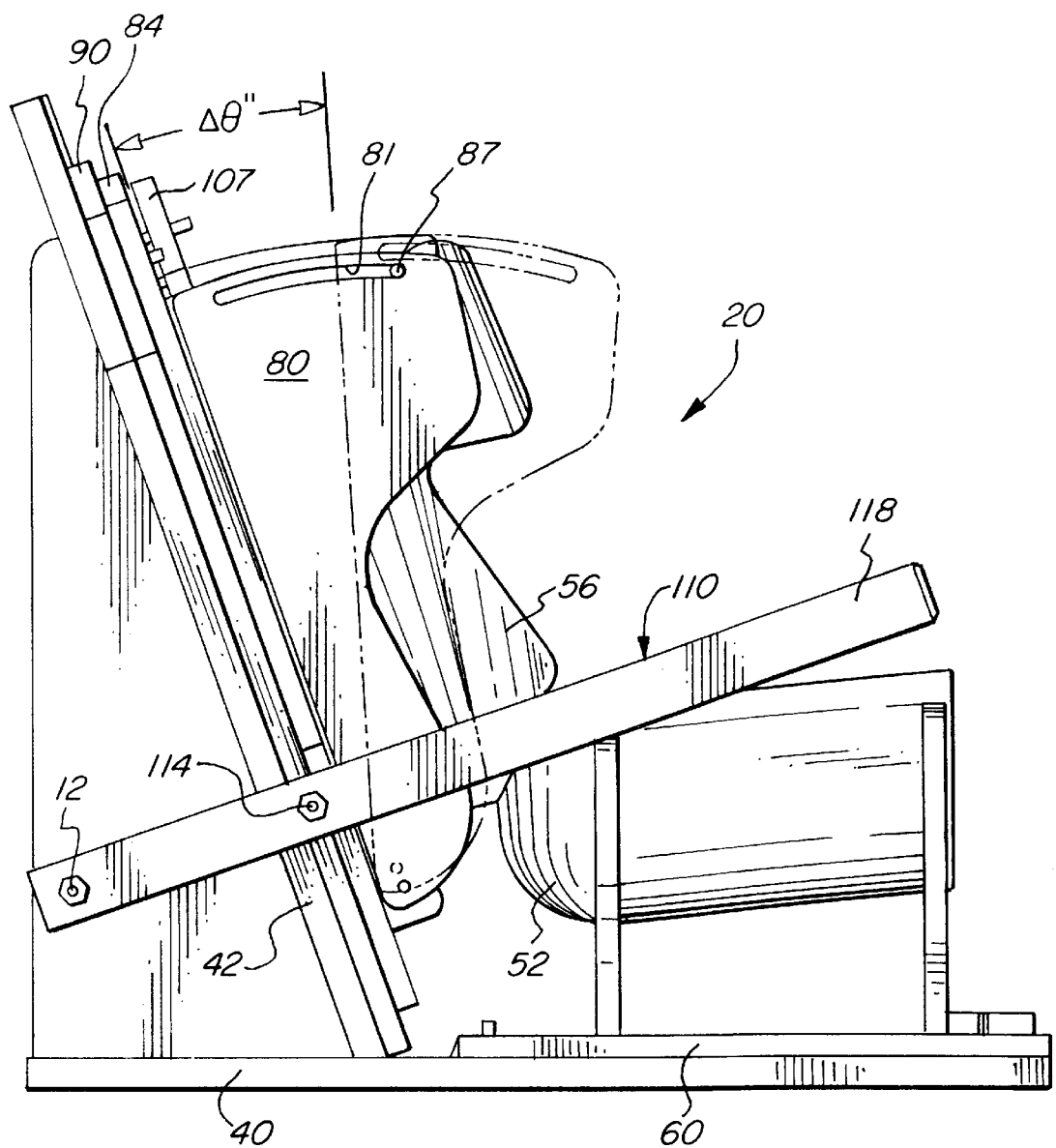
FIG. 10 is a side view of the jig of FIG. 3.

The right seat back fitment 56 and left seat back fitment 58 are adjustably positioned on the back wall 42 of the jig 20. With reference to FIGS. 3–5 and 8–11, the right seat back fitment 56 is mounted to a tilt adjustment plate 80 by means of brackets 82, and the tilt adjustment plate 80 is pivotally mounted to a width adjustment plate 84 by pivot pins 85. The tilt adjustment plate 80 is provided with an arculate slot 81 and the width adjustment plate 84 has a forwardly extending bracket 86 and a post 87 extending through the slot 81. This provides for pivoting the right seat back fitment 56 along the angle $\Delta\Theta''$, as shown in FIG. 10, to adjust the angle of the seat back.

The lateral adjustment plate 84 is mounted for moveable positioning on a height adjustment plate 90 by a pivot pin 92, best seen in FIG. 3, and by an arcuate slot 94 and threaded post 95, positioned near the upper end of the lateral adjustment plate 84. The pivot pin 92 and the pivot pin 64 of the adjustment plate 60 holding the right bottom seat fitment 52 are preferably coordinated to provide alignment between the right seat bottom fitment 52 and the right seat back fitment 56, with lateral adjustments being accomplished through movement of the left seat bottom fitment 54 and left seat back fitment 58.

The left seat back fitment 58 is mounted to a tilt adjustment plate 100, which is in turn mounted to a width adjustment plate 102, in a similar manner as described above with respect to the right seat back fitment 56 and its tilt and width adjustment plates. The width adjustment plate 102 has a lateral slot 104 adjacent the lower edge thereof, which accommodates a threaded post 105 for securing the lower portion of the width adjustment plate 102 to the height adjustment plate 90. An enlarged slot 106 is formed near the upper end of the width adjustment plate 102 and is provided with a post and clamping block 107. As illustrated in FIGS. 8 and 9, the foregoing structure provides for a broad range of positioning of the left and right seat back fitments 56, 58 with respect to the right and left seat bottom fitments 52, 54, including variations in lateral spacing and angular orientation.

Figure 11:
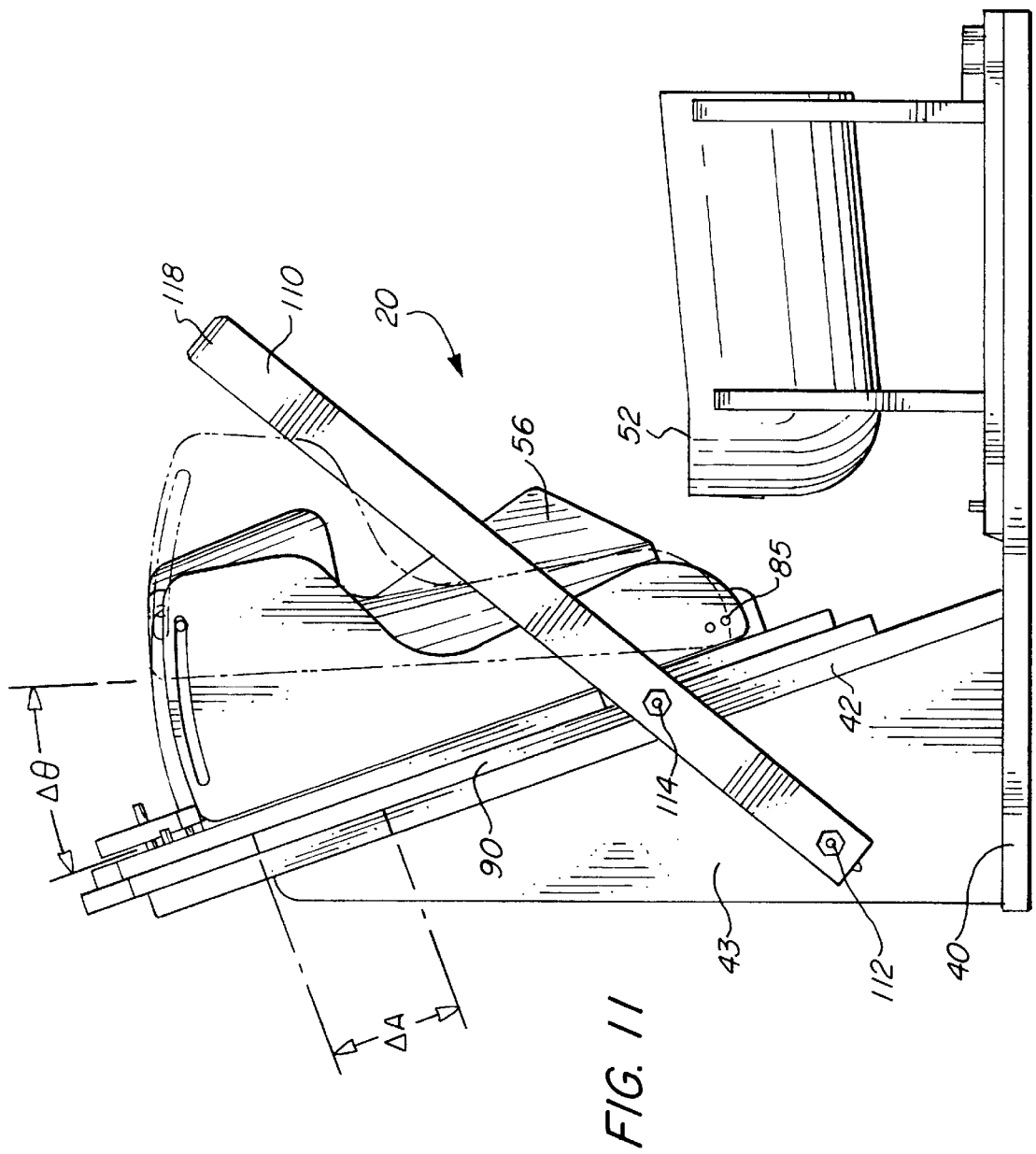
FIG. 11 is a side view of the jig of FIG. 3, similar to FIG. 10 but with the seat back fitments in different adjusted positions.

The right and left seat back fitments 56 and 58 are also adjustable for height with respect to the right and left seat bottom fitments 52 and 54. With reference to FIGS. 3, 10 and 11, the height adjustment panel 90 is slidably positioned along the back wall 42, and may be raised or lowered by means of lever 110. The lever 110 is loosely pivotally mounted at 112 to a bracket 43 supporting the back wall 42. The lever 110 is also pivotally connected at 114 to the height adjustment panel 90. Manipulating the distal end 118 of the lever 110 raises and lowers the height adjustment plate 90 and the right and left seat back fitments 56, 58 mounted thereon.

It is desired, the base 40 may also be mounted for tiltable positioning, for further adjustment of the right and left seat bottom fitments 52, 54.

The jig 20 is used by seating a race car driver on the seat fitments 52, 54, 56 and 58, and adjusting the seat fitments until the driver is closely accommodated therein, is fully supported, and is comfortable. It is preferable to place a partial mock up of a race car, including steering wheel, pedals and gear shift forward of the jig 20, so that the driver can ascertain the optimum position of the seat with respect to the control mechanisms. It will be appreciated that the jig 20 provides a full range of adjustment of all the seat fitments such that the driver can select the optimum fit and position on an individualized basis. The size of the seat fitments is selected such that the gaps are not large between the various seat fitments when adjusted to an average size driver, and the gaps have not proven deleterious to selecting an optimum configuration.

Figure 12:
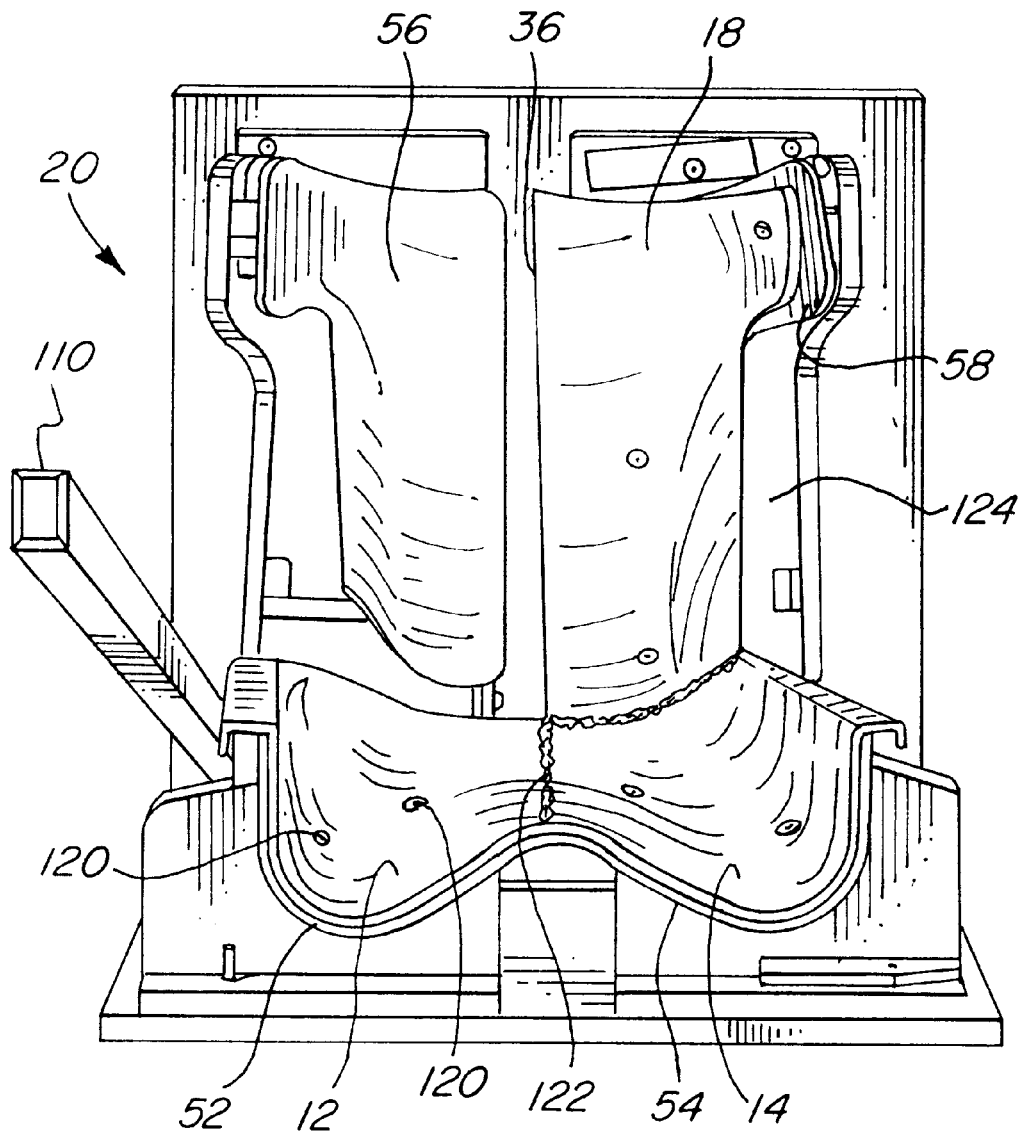
FIG. 12 is a front perspective view of the jig of FIG. 3 and three of the seat quadrants of FIG. 1 being assembled into the seat of FIG. 2.

Once the seat fitments 52, 54, 56, 58 have been placed and secured in the desired position, the jig 20 is used in fabricating race car seat 10. With reference to FIG. 12, right seat bottom quadrant 12 is removably secured to the right seat bottom fitment 52 by temporary fasteners 120, and left seat bottom quadrant 14 is similarly and temporarily secured to the left seat bottom fitment 54. As discussed above, the seat fitments are cut down, reduced sized seat quadrants, wherein the seat quadrants conform and nest in the corresponding seat fitments during the fabrication process illustrated in FIG. 12.

It will be appreciated that the right and left seat bottom quadrants 12, 14 are trimmed along their respective central longitudinal edges 22 and 26, so that the edges meet at seam 122. Some minor bending of the seat quadrants adjacent to seam 122 may be necessary to achieve a smooth transition, but such bending does not affect the overall conformance of the seat to the configuration selected by the position adjusted seat fitments. The seam 122 is welded to join the seat quadrants 12 and 14. Although shown fully welded in FIG. 12, it is also contemplated to tack weld seam 122 with the seat quadrants 12 and 14 in the jig 20, and complete the welding of seam 122 after the seat has been removed from the jig. It is easier to make the welds for all the seams after the seat quadrants have been secured together and removed from the jig 20.

In FIG. 12, the left seat back quadrant 18 is also shown temporarily secured to the left seat back fitment 58, and the lateral edge 36 of the left seat back quadrant 18 and the lateral edge of the left seat bottom quadrant 14 are trimmed and adjusted to meet at seam 124. The longitudinal central edge 36 of the left seat back quadrant 18 is also trimmed, in preparation for fitting the right seat back quadrant 16 to the right seat back fitment 56.

Once the seat quadrants have been positioned by the seat fitments and tacked or welded together, they are removed from the jig and welding is completed as required. With reference to the seat 10 shown in FIG. 2, the seat quadrants 12, 14, 16 and 18 are fully welded together to form a custom shaped seat. Additional stiffening members, such as a front cross member 130, side rails 132 and 134, shoulder rail 136 and head rest 138 are welded to the periphery seat quadrants to complete fabrication of the seat 10.

The seat 10 may be provided with a thin layer of upholstery, including light padding, if desired by the driver. If the driver does desire padding in the seat, the padding may also be provided on the fitments at the time the seat fitments are adjusted to the driver, to more closely customize the configuration and fit of the seat.

The seat 10 constructed in the manner described above using the jig 20 closely fits the race car driver to which the jig was adjusted. The jig and method of construction are very efficient in terms of time and expense in relation to the quality and fit of the fabricated seat 10.

Accordingly, the racing seat, and the jig and method for making a race car seat described above, admirably achieve the objects of the invention herein. It will be appreciated that modifications may be made by those skilled in the art without departing from the spirit and scope of the invention which is limited only by the following claims.

I claim:

1. A race car seat for a race car driver, comprising:
  A) a right seat bottom quadrant formed from sheet metal and sized and shaped to substantially fit to the right buttock and thigh of a race car driver, the right seat bottom quadrant having a longitudinal central edge disposed generally centrally along the race car seat and a lateral upper edge disposed generally centrally across the race car seat;
  B) a left seat bottom quadrant formed from sheet metal and sized and shaped to substantially fit to the left buttock and thigh of a race car driver, the left seat bottom quadrant having a longitudinal central edge disposed generally centrally along the race car seat and welded to the longitudinal central edge of the right seat bottom quadrant and also having a lateral upper edge disposed generally centrally across the race car seat;
  C) a right seat back quadrant formed from sheet metal and sized and shaped to substantially fit to the right back and shoulder of a race car driver, the right seat back quadrant having a lower lateral edge disposed generally centrally across the race car seat and welded to the lateral upper edge of the right seat bottom quadrant, and also having a longitudinal central edge disposed generally centrally along the race car seat; and
  D) a left seat back quadrant formed from sheet metal and sized and shaped to substantially fit to the left back and shoulder of a race car driver, the left seat back quadrant having a lateral lower edge disposed generally centrally across the race car seat and welded to the lateral upper edge of the left seat bottom quadrant, and also having a longitudinal central edge disposed generally centrally along the race car seat and welded to the longitudinal central edge of the right seat back quadrant.

2. A race car seat as defined in claim 1 wherein the seat quadrants are formed from stamped sheet metal.

3. A race car seat as defined in claim 1 wherein the seat quadrants are aluminum sheet metal.

4. A race car seat as defined in claim 1 and further comprising a plurality of stiffening members welded to the seat quadrants, including at least a front cross member welded to the right and left seat bottom quadrants and a head restraint welded to the right and left seat back quadrants.

5. A method of fabricating a race car seat for a race car driver, comprising the steps of:
   A) forming at least two each of an oversized right seat bottom quadrant, left seat bottom quadrant, right seat back quadrant and left seat back quadrant of the race car seat;
   B) trimming one each of the right seat bottom quadrants, left seat bottom quadrants, right seat back quadrants and left seat back quadrants to form seat fitments generally undersized with respect to seat quadrants sized to fit together to form a face car seat fitted to a race car driver;
   C) adjustably positioning the undersized seat fitments with respect to a race car driver in an optimum driving position and securing the seat fitments in the optimum position, the undersized seat fitments being at least partially spaced apart in their adjusted positions;
   D) respectively removably securing the oversized right and left seat bottom quadrants to the adjustably positioned right and left seat bottom fitments, and the right and left seat back quadrants to the adjustably positioned right and left seat back fitments, including trimming and shaping the seat quadrants to define adjacent edges; and
   E) joining the removably secured seat quadrants into a unitary race car seat and removing the unitary race car seat from the seat fitments.

6. A method of fabricating a race car seat as defined in claim 5 wherein the seat quadrants are fabricated of sheet metal and the step of joining the seat quadrants includes welding the seat quadrants together.

7. A method of fabricating a race car seat as defined in claim 6 wherein the seat quadrants are tack welded together before being removed from the fitments and are additionally welded together thereafter.

8. A method of fabricating race car seat as defined in claim 5 and further comprising the step of securing peripheral stiffening members to the joined seat quadrants.

9. The method of fabricating race car seat as defined in claim 5 and further comprising step of positioning the race car driver in proximity to race car controls while adjustably positioning the fitments with respect to the race car driver.

10. A jig for constructing a race car seat for a race car driver, comprising:
    A) a base and a back wall;
    B) a right seat bottom fitment configured to substantially conform to the right buttock and thigh of a race car driver and supported on a right seat bottom adjustment plate, said right seat bottom adjustment plate movably mounted on the base and securable thereon with the right seat bottom fitment in an adjusted position;
    C) a left seat bottom fitment configured to substantially conforming to the left buttock and thigh of a race car driver and supported on a left seat bottom adjustment plate, said left seat bottom adjustment plate movably mounted on the base and securable thereon with the left seat bottom fitment in an adjusted position;
    D) a right seat back fitment configured to substantially conform to the right back and shoulder of a race car driver and supported on right seat back adjustment plate means, the right seat back adjustment means movably mounted to the back wall and securable thereon with the right seat back fitment in an adjusted position; and
    E) a left seat back fitment configured to substantially conform to the left back and shoulder of a race car driver and supported on left seat back adjustment plate means, the left seat back adjustment plate means movably mounted to the back wall and securable thereon with the left seat back fitment in an adjusted position;
    wherein the right seat bottom fitment, left seat bottom fitment, right seat back fitment and left seat back fitment are adjustable and securable in adjusted positions closely accommodating a race car driver, and the fitments are adapted for supporting elements of a race car seat in a driver adjusted position while joining the race car seat elements.

11. A jig as defined in claim 10 wherein the right and left seat back adjustment plate means each include a tilt adjustment plate for adjusting seat back angle.

12. A jig as defined in claim 11 wherein the right and left seat back adjustment plate means each include a width adjustment plate.

13. A jig as defined in claim 12 wherein the right and left seat back adjustment plate means includes a height adjustment plate.

14. A jig as defined in claim 13 and further comprising lever means for adjustably positioning the height adjustment plate.

15. A jig as defined in claim 13 wherein the right and left seat back fitments are respectively adjustably mounted to right and left tilt adjustment plates, the right and left tilt adjustment plates are respectively mounted to right and left width adjustment plates, the right and left width adjustment plates are each mounted to a height adjustment plate, and the height adjustment plate is mounted to the back panel of the jig.

16. A jig as defined in claim 15 and further comprising lever means for adjustably positioning the height adjustment plate.

17. A jig as defined in claim 10 wherein the right and left seat back adjustment plate means each include a width adjustment plate.

18. A jig as defined in claim 10 wherein the right and left seat back adjustment plate means includes a height adjustment plate.

19. A jig as defined in claim 10 wherein the seat fitments are reduced size portions of seat quadrants adapted for removable mounting on seat fitments for being joined to form a race car seat.

20. A jig as defined in claim 19 wherein the seat fitments are formed of stamped metal.

* * * * *